(12) United States Patent
Andersen et al.

(10) Patent No.: US 9,224,003 B2
(45) Date of Patent: Dec. 29, 2015

(54) METHOD FOR SECURE STORING AND SHARING OF A DATA FILE VIA A COMPUTER COMMUNICATION NETWORK AND OPEN CLOUD SERVICES

(71) Applicant: INVENIA AS, Tromso (NO)

(72) Inventors: Anders Andersen, Tromso (NO); Oyvind Pedersen, Tromsdalen (NO); Terje Wold, Tromso (NO)

(73) Assignee: INVENIA AS, Tromso (NO)

( * ) Notice: Subject to any disclaimer, the term of this patent is extended or adjusted under 35 U.S.C. 154(b) by 0 days.

(21) Appl. No.: 14/394,865

(22) PCT Filed: Oct. 2, 2012

(86) PCT No.: PCT/NO2012/050188
§ 371 (c)(1),
(2) Date: Oct. 16, 2014

(87) PCT Pub. No.: WO2013/157957
PCT Pub. Date: Oct. 24, 2013

(65) Prior Publication Data
US 2015/0113279 A1 Apr. 23, 2015

(30) Foreign Application Priority Data
Apr. 19, 2012 (WO) ................ PCT/NO2012/050071

(51) Int. Cl.
| | |
|---|---|
| *H04L 9/32* | (2006.01) |
| *G06F 21/62* | (2013.01) |
| *H04L 29/06* | (2006.01) |
| *H04L 29/08* | (2006.01) |
| *G06F 17/30* | (2006.01) |
| *H04L 9/08* | (2006.01) |

(52) U.S. Cl.
CPC ...... *G06F 21/6218* (2013.01); *G06F 17/30342* (2013.01); *H04L 9/0863* (2013.01); *H04L 63/045* (2013.01); *H04L 63/0457* (2013.01); *H04L 63/06* (2013.01); *H04L 63/061* (2013.01); *H04L 63/083* (2013.01); *H04L 67/06* (2013.01); *H04L 67/1097* (2013.01); *H04L 67/146* (2013.01)

(58) Field of Classification Search
CPC .................................................. G06F 21/6218
USPC .......................................................... 713/171
See application file for complete search history.

(56) References Cited

U.S. PATENT DOCUMENTS

2014/0373116 A1* 12/2014 Hajduczenia

* cited by examiner

*Primary Examiner* — Peter Shaw
(74) *Attorney, Agent, or Firm* — Young & Thompson

(57) ABSTRACT

A computer implemented method, server computer and computer program for securely storing a data file via a computer communication network and open cloud services. The method includes: providing a user's computer with code for providing a unique user name; asking the user for a password; generating an asymmetric key pair having one public key and one private key; encrypting the private key via a hash of the password; generating a file-specific symmetric key specific for the data file; encrypting the data file via the file-specific symmetric key; encrypting the file-specific symmetric key via the public key; where the code is executed by a web browser on the computer; storing the encrypted file-specific symmetric key as a header part of the encrypted data file, and interacting with the file exchange interface of a cloud service which receives the encrypted data file, and storing the encrypted data file and header part.

19 Claims, 10 Drawing Sheets

| Encrypted file-specific symmetric key U1 | Encrypted Information File | Encrypted Data File |

METHOD FOR SECURE STORING AND SHARING OF A DATA FILE VIA A COMPUTER COMMUNICATION NETWORK AND OPEN CLOUD SERVICES

FIELD OF THE INVENTION

The present invention relates to a method for secure storing, and sharing of a data file, folder or folders via a computer communication network and open cloud services, and a server computer, cloud services and a computer program implementing the method.

BACKGROUND OF THE INVENTION

There are several known technologies for online storing and sharing of data files. For example a service may provide server capacity, where registered users can transfer data files between their personal/work computer device and the server via internet for backup of data files, for sharing data files, for collaboration on data files, for synchronisation of data files etc. Some service providers use encryption methods when transferring files between the server and the computer device of the user.

The encrypted transfer of a file between the computer device and the server often uses a protocol like the Hypertext Transfer Protocol Secure (HTTPS) to encrypt the transfer of a data file from the computer device to the server. Hence, the server receives an encrypted file, but when received, the data file is decrypted and the data file is stored unencrypted. A person with administration privileges on the server will easily have access to the data file.

Some service providers also offer a system with the possibility of encrypting the data file before transferring the file to the server, and storing of the data file encrypted on the server. In order to share the data file, the encryption key must be stored together with the encrypted data file. Again, a person with administrator privileges may then access the file. Alternatively, no encryption key is stored on the server; however, no sharing of the data file is then possible.

Lately the market has seen a new generation of cloud services for file storage and sharing, hereafter called cloud storage services or merely cloud services. These cloud storage services for file storage and sharing is rapidly becoming very popular. Some of these new cloud storage services offer "secure" storage and sharing as an optional service. These systems may implement encryption as a security mechanism. Encryption key escrow is part of the service offering. An example of such offering is the product "Dropbox", that offer services for storing, sharing and accessing photos, docs and other filetypes anywhere with emphasis on availability across platforms such as computers and phones. Main feature is the guarantee that none of the information ever will be lost. Other examples of products that offer similar cloud service are Google Drive, Microsoft Skydrive and Sharefile.

The problem with these cloud storage services is that either the user must entrust the cloud storage services with their unsecured files, or they need to trust the key escrow features of the cloud storage services. This is a big problem since the file owner must rely on confidentiality of a 3.rd party.

One object of the present invention is to provide a method and system for secure storing of a data file via a cloud service, which in the case when the web browser version is in use can be used even if the user does not have administrator privileges on his computer and without the need for installation of a separate application. Moreover, one object is to provide that the data files are kept continuously encrypted from the time when the data file is leaving the computer device of the user and to the time when the same or another computer device is receiving the data file from the cloud service. In this way it is avoided that a person with administration privileges has access or can get access to the unencrypted data file. Moreover, if a person without privileges breaks into the cloud service, he/she will not get access to the unencrypted content of the data files as well.

Further there is an object of the present invention to provide a watertight system for key generation and management, where only the person authorised to decrypt the data files have access to the data file encryption keys.

Another object is to provide a method and system where the user can give access to the data file to other users.

It is also an object of the invention to provide a method and system that is equally adaptable to any type of user computer, and to any type of cloud data storage services.

SUMMARY OF THE INVENTION

The present invention relates to a computer implemented method for secure storing and sharing of a data file or folder via a cloud service for file storage and sharing and a computer communication network and server for user management providing user registration and optionally code for encryption and encryption key generation, the method further comprising the steps of:
    providing a computer device of a user with code for:
        providing a unique user name for the user;
        asking the user for a password;
        generating an asymmetric key pair for the user having one public key and one private key;
        encrypting the private key of the user by means of a hash of the password, resulting in an encrypted private key;
        generating a file-specific symmetric key specific for the data file;
        encrypting the data file by means of the file-specific symmetric key, resulting in an encrypted data file;
        encrypting the file-specific symmetric key by means of the public key of the user, resulting in an encrypted file-specific symmetric key;
    where the code is executed by a web browser on the computer device;
        storing the encrypted file-specific symmetric key as a header part of the encrypted data file;
        interact with the file exchange interface of a cloud service; the cloud service receiving the encrypted data file and storing the encrypted data file and header part;
        storing the public key of the user and the encrypted private key of the user in a user management system.
    In one aspect, the method comprises the steps of:
    providing the computer device of the user with code for:
        generating an information file with information about the data file;
        encrypting the information file by means of the file-specific symmetric key;
        storing the encrypted information file as a header part of the encrypted data file and arrange it between the encrypted data file and the encrypted file specific symmetric key;
    In one aspect, the information about the data file comprises at least one of, but not limited to, the following elements: a file creation date, a file name, a unique file identifier, created timestamp, modified timestamp, and a file size.
    In one aspect, the method comprises the steps upon receiving a login request comprising the unique user name from the computer device:

identifying the user by means of the unique user name;
generating a unique session-ID;
encrypting the session-ID by means of the public key of the user;
sending the encrypted private key of the user to the computer device;
sending the encrypted session-ID to the computer device;
providing the computer device of the user with code for:
  asking the user for the password;
  decrypting the encrypted private key by means of the hash of the password;
  decrypting the encrypted session-ID by means of the private key;
where the code is executed by the web browser on the computer device;
receiving the session-ID from the computer device;
comparing the received session-ID with the generated session-ID;
accepting the login request if the received session-ID is identical to the generated session-ID.

In one aspect, the method comprises the steps of,
launching the cloud service, and in the cloud service:
  select the required encrypted data file,
  receive the selected encrypted data file
providing the computer device with code for:
decrypting the encrypted file-specific symmetric key by means of the private key;
decrypting the encrypted data file by means of the decrypted file-specific symmetric key;
where the code is executed by the web browser on the computer device.

In one aspect, the method further comprises the steps of:
providing the computer device with code for:
  decrypting the encrypted information file by means of the decrypted file-specific symmetric key;
where the code is executed by the web browser on the computer device.

In one aspect, the method comprises the steps of:
receiving a contact request from the computer device of the user for establishing contact between the user and a further user;
sending a confirmation request to the further user;
receiving an acceptance of the confirmation request from the further user;
storing contact information about the contact between the user and the further user in the user management system.

In one aspect, the method comprises the steps of:
indicating which data file to share;
indicating a further user to share the data file with;
sending the public key of the further user to the computer device;
providing the computer device of the user with code for:
  decrypting the encrypted file-specific symmetric key by means of the private key;
  encrypting the decrypted file-specific symmetric key as a further file-specific symmetric key by means of the public key of the further user;
  storing the encrypted file specific symmetric key and the further encrypted file-specific symmetric key as a header part of the encrypted data file;
In one aspect, the method comprises the steps of,
the cloud services upon receiving a data file request from the computer device of the further user:
the cloud services sending the encrypted data file to the computer device of the further user;
providing the computer device of the further user with code for:
  decrypting the encrypted further file-specific symmetric key by means of the private key;
  decrypting the encrypted data file by means of the decrypted further file-specific symmetric key;
where the code is executed by the web browser on the computer device.

In one aspect, the method comprises the steps of:
providing the computer device of the user with code for:
  providing an indication of which data file to share;
  asking the user for an e-mail address of a non-registered user to share the data file with;
  generating a password for the non-registered user;
  sending the password to the non-registered user;
  providing a hash of the password of the non-registered user by means of a hash function;
  generating a file-specific symmetric key specific for the data file;
  encrypting the file-specific symmetric key by means of the password;
  storing the encrypted file-specific symmetric key as a header part of the encrypted data file;
where the code is executed by the web browser on the computer device;
receiving the indication of which data file to share, the e-mail address, the hash of the password and the encrypted file-specific symmetric key;
sending an e-mail to the e-mail address of the non-registered user containing a link to a page on the server;
where, when the nonregistered user is opening the link, the server is providing the non-registered user with code for:
  asking the non-registered user for the e-mail address and the password;
  providing a hash of the password by means of the hash function;
where the code is executed by the web browser on the computer device of the non-registered user;
receiving the e-mail address and the hash of the password from the non-registered user;
generating a unique session-ID;
encrypting the session-ID by means of the hash of the password of the non-registered user;
sending the encrypted session-ID to the computer device of the non-registered user;
providing the non-registered user with code for:
  decrypting the encrypted session-ID by means of the hash of the password;
where the code is executed by the web browser on the computer device;
receiving the session-ID from the computer device of the non-registered user;
comparing the received session-ID with the generated session-ID;
when the non-registered user has accessed the cloud services and retrieved the encrypted file therefrom;
providing the non-registered user with code for:
  decrypting the encrypted file-specific symmetric key by means of the password;
  decrypting the encrypted data file by means of the decrypted file-specific symmetric key;
where the code is executed by the web browser on the computer device.

In one aspect, the password is sent to the non-registered user by means of an e-mail application installed on the computer device of the user.

In one aspect, the password is sent to the non-registered user by means of a SMS, MMS or similar service.

The invention also relates to a server computer, configured to perform a method as set forth above.

The invention also relates to a computer program, comprising processing instructions which enables a server computer to perform a method as set above.

DETAILED DESCRIPTION

Embodiments of the invention will now be described in detail with reference to the enclosed drawings, where:

DEFINITIONS

The term "computer device" is here used to denote any type of electronic device which can be connected to Internet, and which can read, open, change or store a data file. This would typically be a stationary or portable computer, a laptop, a notebook, a mobile phone, a smart phone, an internet tablet, a smart TV or similar type of device.

The term "data file" is here used to denote any type of electronic information which can be stored on a computer device, a server, or cloud services, for example, but not limited to text documents, spreadsheets, presentations, multimedia files (images, music, movies etc), computer source code etc. It should be noted that a folder can also be considered as a data file including its content files.

The term "web browser" is here used to denote a computer application which is installed on the computer device and which the user can use to retrieve, present and traverse information resources on the World Wide Web/internet. The web browser would typically be, but not limited to, Internet Explorer, Mozilla FireFox, Safari, Opera, Google Chrome, Chromium or other web browsers. When the term "executed in the web browser" is used, it should be understood that the same function can be solved by a preinstalled application or applications running under the operating system of the host computer, for example, but not limited to, a Windows, Linux or Apple OS X applications, or even handheld versions of for example, but not limited to, iOS, Android or Windows.

The term "server" is here used to denote a computer server which the user can interact with by using the web browser or programs installed on the computer device. The server comprises a web service for storing and organizing user data, passwords and encryption keys, as will be apparent from the description below. The server may comprise one physical computer server, but may also comprise several servers connected to each other.

Figure 1:
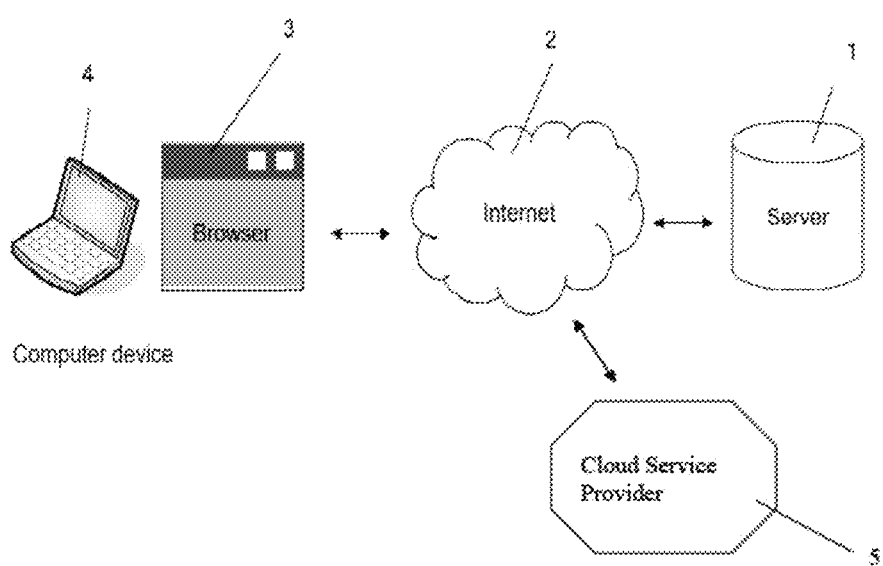
FIG. 1 is a schematic block diagram illustrating principles of the communication of the present invention.

It is now referred to FIG. 1, illustrating a first embodiment of a computer implemented method for secure storing of a data file or folder on a cloud services 5 via a computer communication network 2, typically the internet. In FIG. 1, it is shown communication via internet 2 between the server 1 and a web browser or program 3 installed on a computer device 4, and further a communication between the cloud services 5 and a web browser or program 3 installed on a computer device 4.

In the description below, the embodiment is viewed from the server 1. In an aspect, the disclosed computer-implemented method is performed by the server 1, e.g. by a processing device included in the server 1.

Initially, the user is opening the web browser 3 on the computer device 4 and is directing the web browser to the domain name or IP address of the server 1, for example http://www.example.com.

In return of the request, the server 1 is providing the computer device 4 with code by sending the code to the web browser via internet, after which the code is executed by the web browser 3 on the computer device 4. The code comprises some information, typically in the form of information files (html/xml files) and/or appearance controlling files (css-stylesheets). Moreover, the code comprises code that can be executed by the web browser, for example ECMA-script code, commonly known as JavaScript or Jscript. Today, JavaScript code is the only option for cross browser support. However, it could also be possible to implement the code as VBScript code that can be executed in Internet Explorer by Microsoft. There could be other alternatives as well. Hence, it is possible to perform the computer-implemented method without installing a separate software application on the computer device. Alternatively, the code could be provided as a plug-in for the web browser by using an API (Application Programming Interface) for the web browser. Such APIs are known for web browsers like Google Chrome, Internet Explorer, Mozilla Firefox and others. Such plug-ins can most often be installed on the computer device without administrator privileges.

Another option according to FIG. 1 is to use a combination of preloaded programs and scripts transferred via internet to the web browser.

First a registration process of the user on the server will be described.

The code executed by the web browser first provides a unique user name for the user. The unique user name may be the e-mail address of the user, which per se is unique. Alternatively, the user name can be automatically generated by the code itself, random functions. In yet an alternative, the user may suggest his/her own user name.

The code executed by the web browser may then perform a check whether the user name is unique, by sending a request to the server 1 to check if the user name already has been registered or not. If the user name has already been registered it is per se not unique, and the user is required to provide another user name.

The code executed by the web browser is then asking the user for a password. The password is not transferred to the server 1.

The code executed by the web browser is then generating an asymmetric key pair for the user having one public key and one private key. The algorithm for generating such asymmetric key pairs is considered known for the skilled person. For example the open source project GNU PGP (http://www.gn-upg.org/) provides source code for such key generation in the C programming language.

The code executed by the web browser is then encrypting the private key of the user by means of a hash of the password and produces an encrypted private key. Hence, the private key is only accessible from the encrypted private key by knowing the password. Hash functions are commonly used to generate a hash of a string, such as a password. Such hash functions are considered known for a person skilled in the art, for example SHA1, MD5 etc.

The server is receiving the encrypted private key of the user and the public key of the user from the computer device.

The encrypted private key of the user and the public key of the user are then stored in a user management system of the server.

Thereafter, a data file transferring process will be described.

The user is then prompted to choose desired cloud services. This can be any cloud services, and the program or code executed by the web browser provides appropriate interface to supported cloud services. The code executed by the web browser or program is then requesting the user for the data file or folder which is to be securely stored on the cloud service 5 via the computer communication network 2.

The code executed by the web browser or program is then generating a file-specific symmetric key which is specific for the data file or folder. The file-specific key is hence unique. The process of generation of a symmetric key is also known for a person skilled in the art. Known algorithms for the generation of a symmetric key are for example, but not limited to, Blowfish, AES, Triple-DES. The probability of generating two identical symmetric keys is very low, so there is no need to check for other symmetric keys. Of course, such a check could be performed.

The code executed by the web browser or program is then encrypting the data file or each file of the folder by means of the file-specific symmetric key. Hence, the result is an encrypted data file or as many encrypted data files as there are files in the folder.

Figures 2A, 2B:
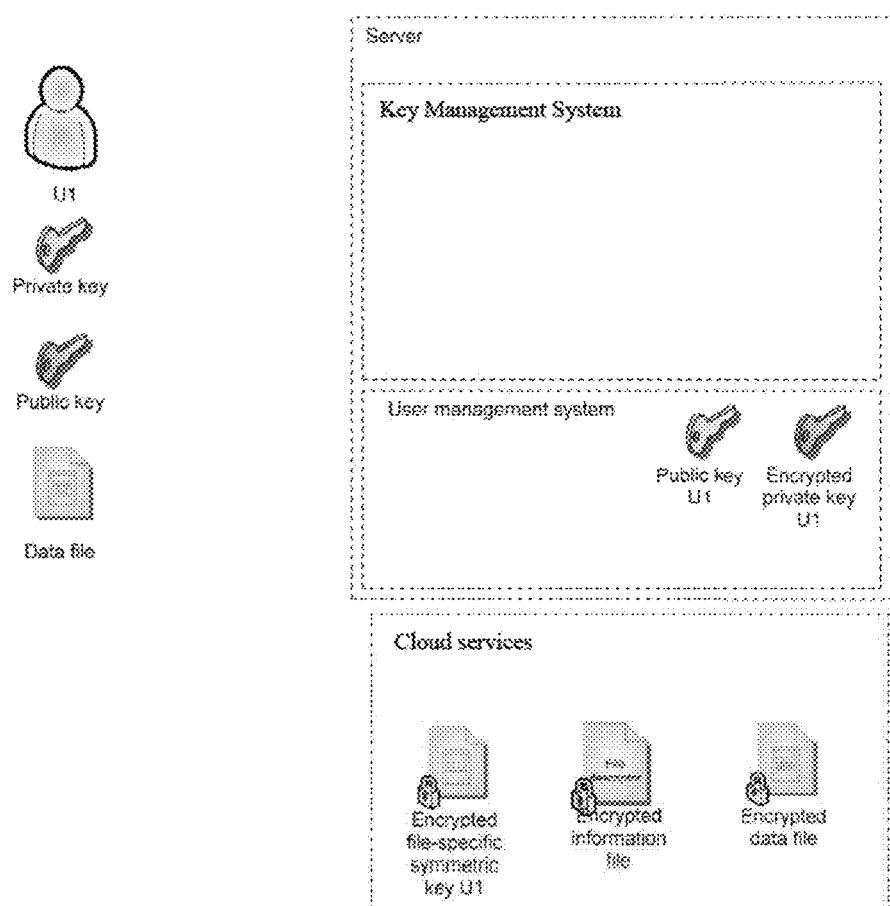
FIG. 2 is a schematic block diagram illustrating files and keys for a first embodiment of the invention.

The code executed by the web browser or program is then encrypting the file-specific symmetric key for each file by means of the public key of the user. Hence, the result is an encrypted file-specific symmetric key which can only be decrypted with the private key of the user. The encrypted file-specific symmetric key is then attached to the encrypted data file as shown in FIG. 2B.

The cloud services is then receiving the encrypted data file and the encrypted file-specific symmetric key The encrypted data file and the encrypted file-specific symmetric key is thereby stored in a file management system of the cloud services. The encrypted private key of the user and the public key of the user are stored in the user management system on the server.

Since many of the above steps related to the key generation and encryption are performed by executing the code in the web browser or a program on the computer device, the server itself will only contain private keys of the users and the cloud services will contain the encrypted data files and the file-specific symmetric keys. Hence, a person having access to the cloud services, or the server without having access to the right private key of the user, does not have access to the content of these files or folders.

It should be noted that the registration process of a user and data file transfer process of transferring a data file from the computer device 4 to the cloud services 5 do not have to be performed simultaneously. The user may use the web browser on the computer device to register at the server in a first operation before the user logs out. The user may then in a second, subsequent operation log in or execute a program, and then select and transfer the data from the computer device to the cloud services.

According to the embodiment described above, the user may now use a web browser on a further computer device, which is different from the computer device used for the registration process and the data file transfer process above, and direct the web browser on the further computer device to the domain name or IP address of the server 1 and perform a login and fetch appropriate keys stored in the user management system. Then when logging into the cloud services with the different computer device, transfer the data files from the further computer device to the cloud services 5 or to transfer data files from the cloud services 5 to the computer device.

The login process will now be described. Upon receiving a login request comprising the unique user name from a computer device 4, the following steps are performed on the server.

First, the user is identified by means of the unique user name. Then a unique session-ID is generated. The session-ID is for example generated by means of a random function, alternatively a check may be performed with respect to other session-IDs. As described above, the public key and the encrypted private key have been stored in the user management system of the server. The session-ID is also stored in the user management system of the server.

The session-ID is encrypted by means of the public key of the user. Then the encrypted private key of the user and the encrypted session-ID are sent to the computer device.

Together with these files, the server 1 is providing the computer device 4 with code by sending the code to the web browser via internet, where after the code is executed by the web browser 3 on the computer device 4.

The code executed by the web browser is then asking the user for the password. If the password is correct, the encrypted private key is decrypted by means of a hash of the password, and the encrypted session-ID is decrypted by means of the private key.

The code executed by the web browser is now sending the session-ID to the server. Hence, the server is receiving the session-ID from the computer device. The server is then comparing the received session-ID with the generated session-ID stored in the user management system, and the login request is accepted if the received session-ID is identical to the generated session-ID. When the login has been accepted, the server is optionally sending information files and code that can be executed by the web browser to the computer device, for the web browser to show a user interface. In the user interface the files and folders shared in the cloud services belonging to the user or being shared with the user are shown. Moreover, there are possibilities to select files stored on the cloud services and transferring them to the computer device and there are also possibilities to select files on the computer device and transferring them to the cloud services. The cloud services may be composed of more than one cloud service provider, i.e. multiple directories/drives.

The data file transfer process for transferring a file or folder from the cloud services to the computer device will now be described. Upon receiving a data file request from the computer device, the following steps are executed. First, the encrypted data file including the encrypted file-specific symmetric key is sent to the computer device from the cloud service. Then, either the server is providing the computer device with code that can be executed by the web browser on the computer device or an installed local application.

The code executed by the web browser is decrypting the file-specific symmetric key by means of the private key. The private key was obtained by the login process described above. Then, the data file is decrypted by means of the decrypted file-specific symmetric key. The data file is then stored in the designated folder on the computer device.

The code for encryption and decryption may be executables preinstalled on the computer device.

An information file with information about the data file can be used for providing additional meta data of files and folders in question. During the data file transferring process of transferring a data file from the computer device to the cloud services, the computer device is provided with code that can be executed by the web browser or program on the computer device.

The code executed by the web browser or program is first generating an information file with information about the data file. Then the information file is encrypted by means of the file-specific symmetric key as described above with respect to the data file transfer process. The encrypted information file is then combined with the encrypted data file and the encrypted file specific symmetric key as shown in FIG. 2B.

The code executed by the web browser or program is then sending the encrypted information file to the cloud services. Hence, the cloud services are receiving the encrypted information file together with the encrypted data file and the encrypted file-specific symmetric key.

The information file may comprise information about the data file, such as a file creation date, a file name, a unique file identifier, created timestamp, modified timestamp, size etc. Hence, the file name is stored encrypted on the cloud services as a part of the encrypted information file.

After a login process, the selected cloud services are sending the encrypted information file to the computer device together with the other files as described above. Moreover, in addition to the code provided by the server described above with respect to the login process, the computer device is also provided with code for execution by the web browser on the computer device for decrypting the encrypted information file by means of the decrypted file-specific symmetric key. This code may also be preinstalled on the computer.

Hence, the file name may be shown to the user in the user interface in the web browser, and it is easy for the user to distinguish the data files from each other.

Above it has been described how a user can use web browsers on different computer devices to access encrypted data files on a cloud services, where a person having administrator privileges on the cloud services cannot access the encrypted data files.

It is further possible to share files between different users, which will be described further in detail below. Here, additional functions are provided as a part of the user interface of the web browser after a login has been performed.

The server is, as described above, providing the computer device with code that can be executed by the web browser on the computer device.

The code executed by the web browser is providing the possibility for the user to provide an indication of which data file the user wants to share. Moreover, the user may provide an indication of a further user, i.e. a user different from himself/herself, to share the data file with. The further user may for example be selected from a list, or there may be a search option to search for names etc.

The server is then sending the public key of the further user to the computer device.

The code executed by the web browser is then decrypting the file-specific symmetric key of the selected file by means of the user's private key. As described above, the private key was transferred to the computer device as part of the login process. Then, the decrypted file-specific symmetric key is encrypted again as a further file-specific symmetric key by means of the public key of the further user. Hence, it is possible for the further user to access the further file-specific symmetric key by using the private key of the further user, as will be described below. The encrypted further file-specific symmetric key is then stored together with the encrypted data, the encrypted information file, and the encrypted file-specific symmetric key of the user, as shown in FIG. 3B. For multiple of further users, or groups of users this process is repeated and encrypted further user specific file specific symmetric keys are added to the encrypted data, the encrypted information file, and the encrypted file-specific symmetric key of the user, as shown in FIG. 3B. A group can act as one further user with equal access rights, and a common public/private key.

When a further user uses the web browser on his/her computer device to login, the further user receives as described above encrypted private key of the further user, which is decrypted by using the further user's password.

Upon receiving a data file request from the computer device of the further user, the cloud services perform the following steps. The server provides the computer device with code for execution by the browser on the computer device or it could be done by a pre-installed program. The cloud services are sending the encrypted data file and the encrypted further file-specific symmetric key to the computer device.

The code executed by the web browser or program is decrypting the encrypted further file-specific symmetric key by means of the private key. Then, the encrypted data file is decrypted by means of the decrypted further file-specific symmetric key. Hence, the further user has access to the shared data file from the user.

It should be noted that it is possible to share a data file with more than one further user. The process described above will then be repeated for these further users.

In FIG. 2 a first embodiment using the methods above is illustrated. A user or first user U1 has a data file, and when registering according to the method described above, a private key and a public key are generated. The file management system of the cloud services is storing the encrypted data file, the encrypted information file and the encrypted file-specific symmetric key for the user U1. The user management system is storing the public key for the user U1 and the encrypted private key for the user U1, of course together with the user name for the user U1.

Figure 3A:
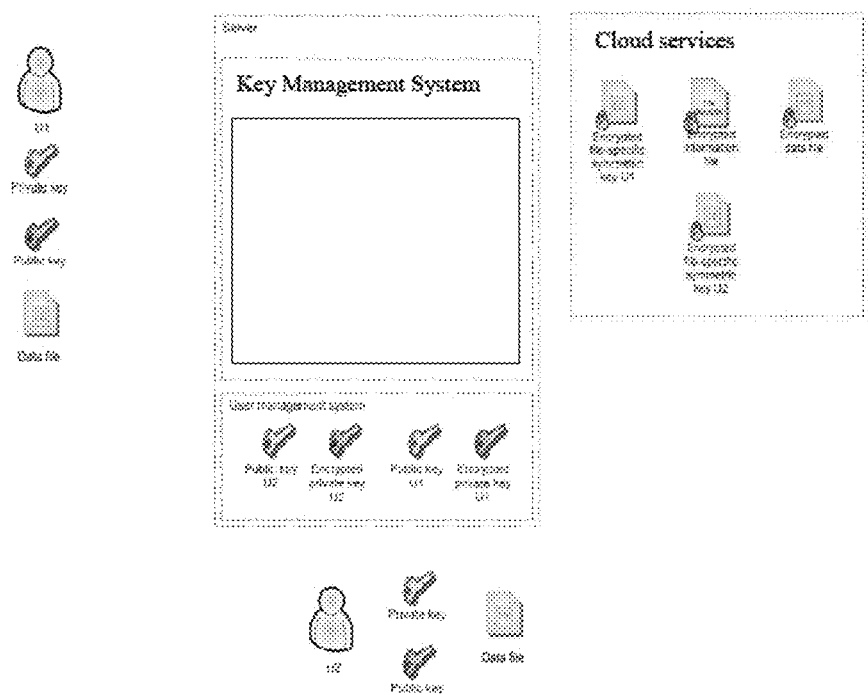
FIG. 3 is a schematic block diagram illustrating files and keys for a second embodiment of the invention.
Figure 3B:
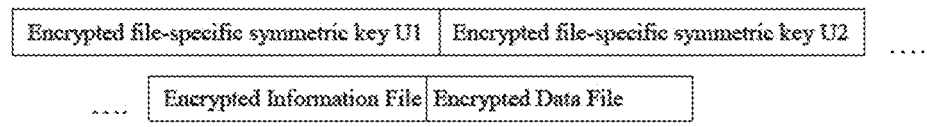

In FIG. 3 a second embodiment using the methods above is illustrated. Here, a second user U2 is also registered. In addition to the files described above, the file management system is storing a further or second encrypted file-specific key U2 for the second user U2. And in addition to the files described above, the user management system is storing the public key for the user U2 and the encrypted private key for the user U2, of course together with the user name for the user U2. As illustrated, the second user U2 can get access to the data file via the cloud services, but without any possibility for the cloud services to get access to the unencrypted data file.

In order to further exemplify the process of secure authentication of a user and further user, and the process of exchanging information file, data file, encryption file key, password and hashed password to respective parties involved in the process of storing and sharing said information the FIGS. 4 to 8 is provided and discussed. The process described in the following does not define error situation, faulty input or other similar incidents. Implementation of the invention will in most practical cases also comprise such features. When the words file, data file, information file, file key, encrypted file key, password, password hash and the like is used in singular form, it is to be understood that the invention also comprise the handling of the same in plurality form.

Figure 4:
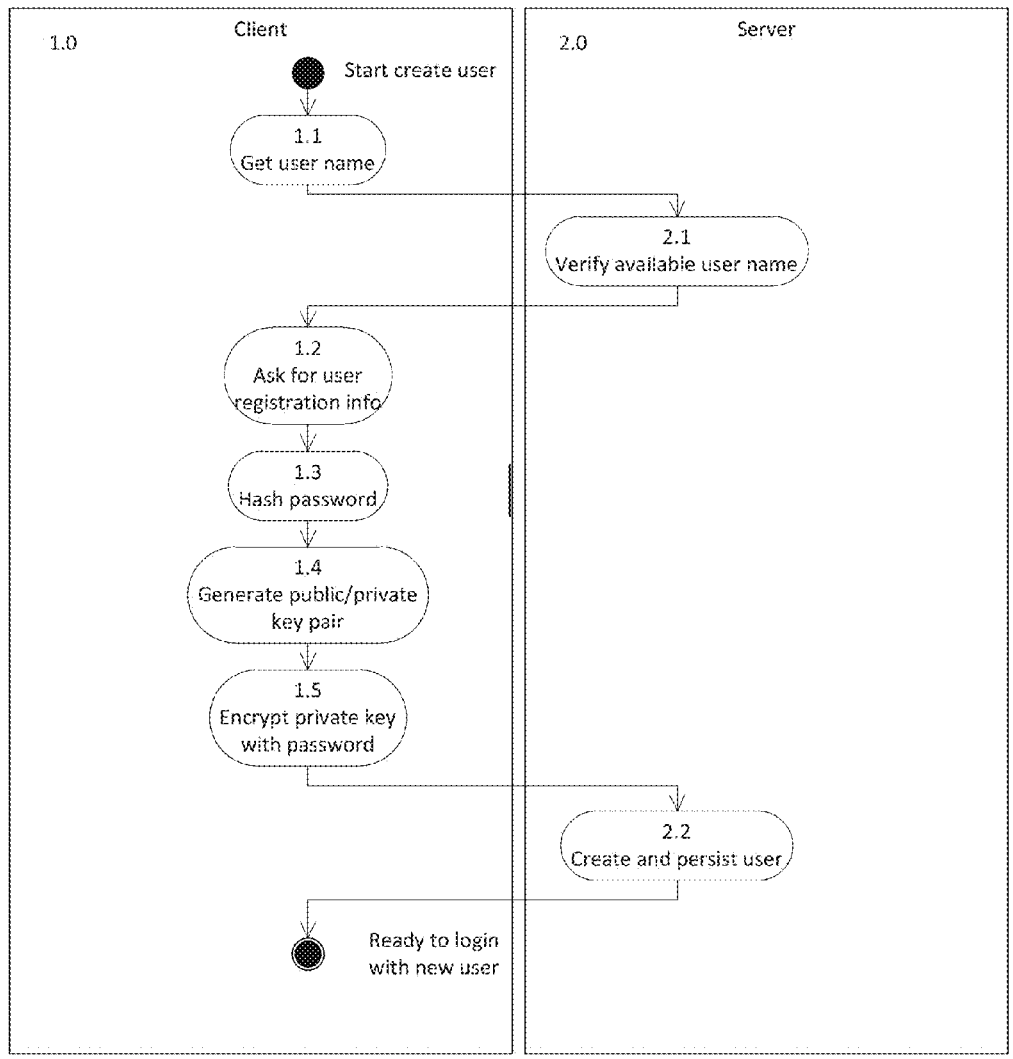
FIG. 4 is a Flow diagram showing the Client-Server communication related to the process of creating a user.

These FIGS. 4-8, shows the information flow when a user has opened a web browser and connected to the server, and further transfer files and folders between the cloud services and the user's computer device. A number of components are downloaded from the web application server upon start-up of the web application. These components comprise, but are not limited to:

dialogue frames, such as for user registration, login, and display and selection of further users
hash function
encryption function
file key generator The user's browser client may offer the interface as a web browser interface and the operations concerned with creation of a user are shown in frame 1.0 in FIG. 4. Frame 2.0 in FIG. 4 represents the operations executed on and by the server in communication with the user on the client.

This scenario is executed once when the user registers to the service. When the user browser connects to the server and the components are downloaded to the client the user is asked to input a user name 1.1. The server then verifies if this user name is a valid user name, and if the user name is available 2.1.

When the user name is approved the user will be asked to input additional information regarding the authorization process. This information typically includes: Authorization code, Name, Password, Secret Question, Answer to Secret Question and other.

The Password is then handled by the component for Hash, resulting in a hashed password 1.3. The component for Hash can comprise one or more hash functions of any type, for example SHA1.

Once the password is hashed and stored, the component for public-/private key generation 1.4 is executed. This results in a key pair comprising a public key and a private key. These keys can be of a variety of lengths and for intended use in a vide variety of algorithms, one example is to use a 2048 bit length key and intended use in an algorithm like the RSA Algorithm.

The private key then is encrypted 1.5 with a symmetric algorithm using password as input. The hashed password is then stored in a file on the server. Optionally the private key can also be encrypted with the answer to the secret question and stored in a database for use if the user forgets the password.

Finally the server application creates and maintain 2.2 the user entry in the user database.

Although the above scenario is explained as a "create new user scenario", it is similarly executed if a user needs to modify the stored information. For such operations the user must first log in as explained below, and then repeat step 1.2 to 1.5. Default values may be presented, alternatively as stored previously.

Figure 5:
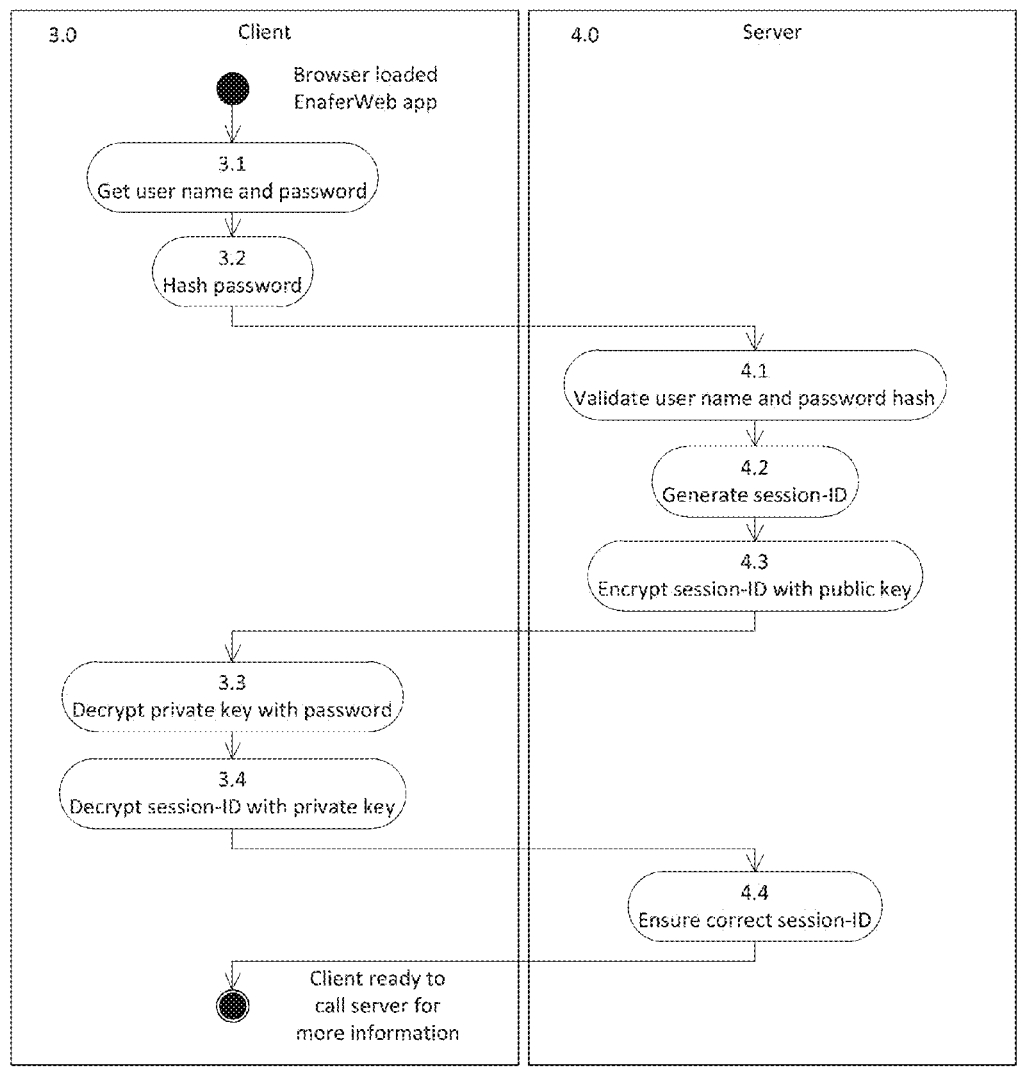
FIG. 5 is a Flow diagram showing the Client-Server communication related to the process of authenticating and logging in the user.

In an embodiment of the invention a previously registered user will when client navigates to the inventions server application and the components of the invention is downloaded to the client, enter the login sequence as defined in FIG. 5. The frames 3.0 and 4.0 represent the communication on the user's client and the server respectively.

The user is prompted for user name and password 3.1, and the password is then hashed 3.2, an operation executed on the client computer. The username and the hashed password are validated 4.1 by the server. The server validates this information with previously stored password hash and username 2.2. If the password hash and the username are valid, the server will generate a unique session-ID 4.2 which will be encrypted with the user's public key 4.3. The public key encrypted session-ID will be sent to the browser client, optionally together with the password encrypted private key to be stored by the server.

The client then decrypts the password encrypted private key 3.3 using the password if the private key was received from the server. Authentication of the user is ensured when the user public key encrypted 4.3 session-ID is decrypted with the user private key 3.4 and returned in clear text to the server. The server then verifies and ensures 4.4 that the session-ID is correctly decrypted by the user by comparing it with the generated session-ID 4.2. Correct received session-ID verifies that the user is authenticated, and the user is considered to be logged in, and the user is allowed to use the services offered by the server to the user through the invention components running on the client.

Figure 6:
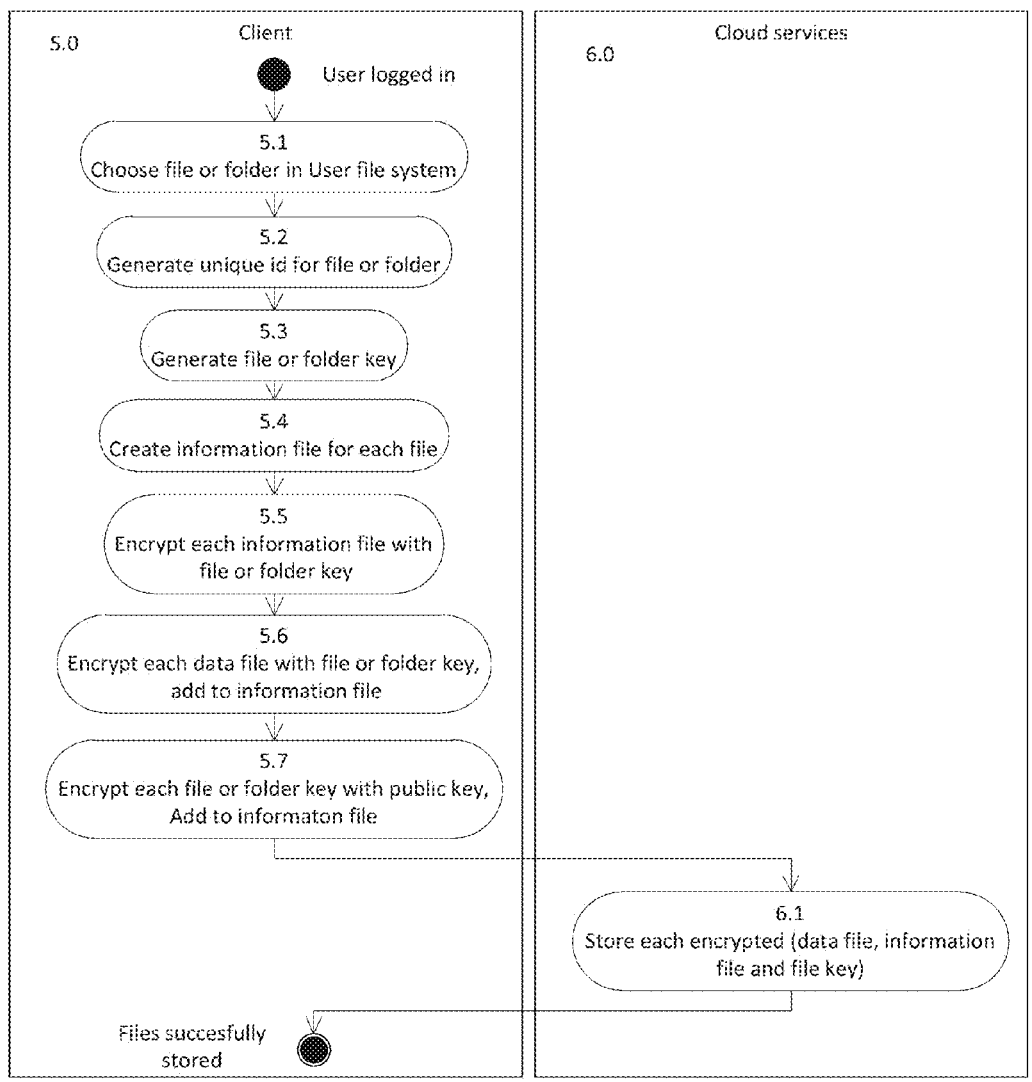
FIG. 6 is a Flow diagram showing the Client-Cloud services communication related to the process of the user storing an encrypted file on the Cloud services.

The user may follow a scheme as described in FIG. 6 to select and store data file and associated information. The frames 5.0 and 6.0 represent the communication on the user's client and the cloud services respectively.

The client component presents in an embodiment of the invention functionality to the user for choosing a file or folder 5.1 from the users file system to be imported to the cloud services. When file or folder is selected, a unique id for each file is generated 5.2, and a file key is generated 5.3. This file key is preferably a symmetric encryption key, for example a 256 bit AES (Advanced Encryption Standard) key. An information file is created 5.4 comprising metadata from each of the chosen files 5.1. These metadata may comprise information such as file name, file creation data, file size, date of last change and more. The information file may also comprise specific information generated by the user and/or the invention application, by the client. Such information may comprise: file-ID, parent folder id of the chosen files 5.1, description of the chosen files in readable text, and other.

Each of the information files are encrypted 5.5 with the file key generated 5.3 for the chosen file. Each of the chosen file 5.1, hereafter called the data file is then encrypted 5.6 with the same file key.

The file key gets encrypted 5.7 with the user's public key. The encrypted data file 5.6, the encrypted information file 5.5 and the encrypted file key 5.7 are stored 6.1 on the cloud services.

The client may receive an acknowledgement of successful operation of storing 6.1 the encrypted data files 5.6, the encrypted information files 5.5 and the encrypted file keys 5.7 on the cloud services.

The system may be designed to handle a folder as a single entity, using the same encryption key on all subfolders and files stored in the folder and subfolder. The file management system of the OS on the computer device and the file management system of the cloud services may offer a wide variety of functionalities that may be utilized in this invention.

Figure 7:
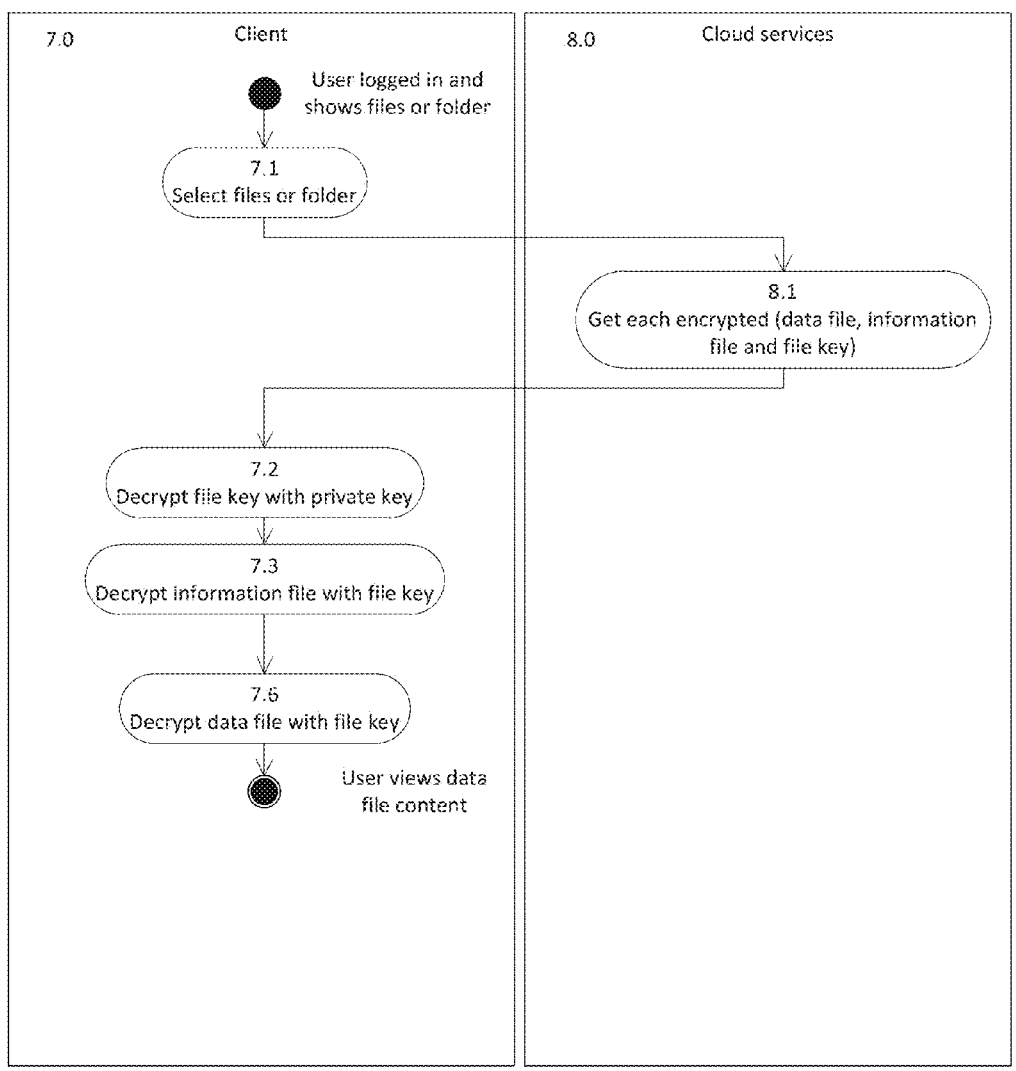
FIG. 7 is a Flow diagram showing the Client-Cloud services communication related to the process of the user retrieving an encrypted file from the Cloud services.

The user may follow a scheme as described in FIG. 7 to select, download and access a data file and associated information stored on the cloud services. The frames 7.0 and 8.0 represent the communication on the user's client and the cloud services respectively.

In one embodiment of the invention, when user has logged in as described above and illustrated in FIG. 5, and then connected to appropriate cloud services, the available data files stored on the cloud services are presented to the user through the client. The user then selects 7.1 what file to transfer. This request is then handled by the cloud services 8.1 which transfer the encrypted data file, the encrypted information file and the encrypted file key to the browser client. The browser client in turn decrypt 7.2 the file key with the private key of the key pair 1.4. Once the file key is available the file key is used to decrypt the information file 7.3 containing the meta data of the data file. These metadata from the information file may then be displayed 7.4 to the user. The user may then be able to decrypt the data file 7.6 with the file key. The user may then be able to view the data file content.

Figure 8:
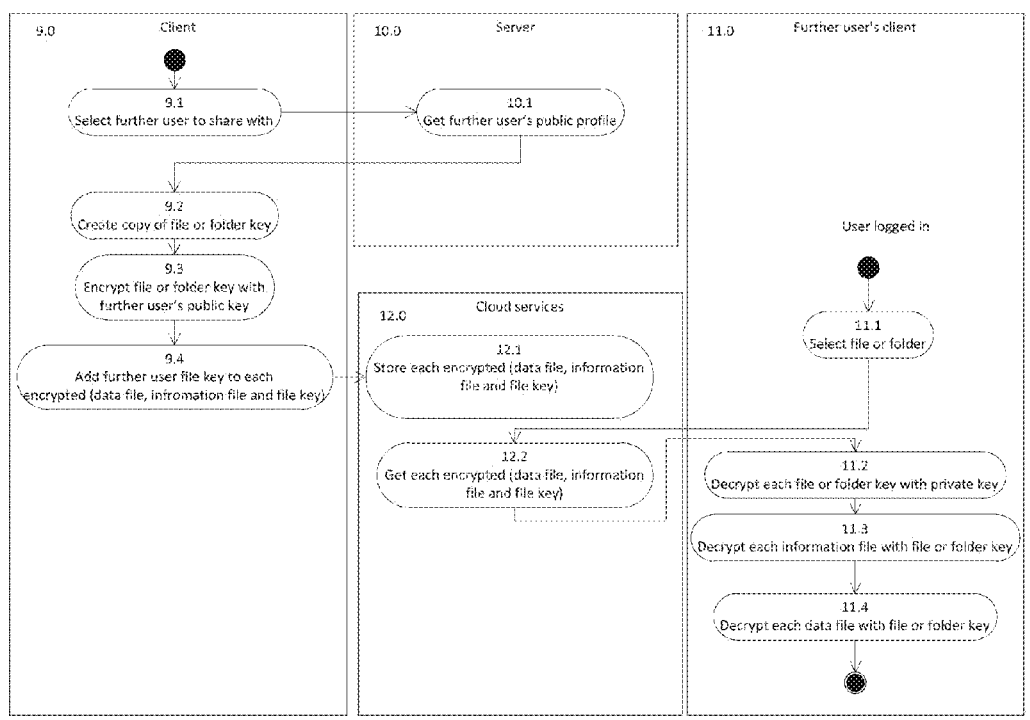
FIG. 8 is a Flow diagram showing the Client-Cloud services—Further user communication related to the process of the user identifying/selecting a further user to share data file, information file and file key with and to exchange the actual information file and file key.

The user may follow a scheme as described in FIG. 8 to identify/select a further user with whom the user wants to share specific file with. The frames 9.0, 10.0 and 11.0 represent the communication on the user's client, the cloud services and the further user's client respectively.

In one embodiment of the invention there may be one or several further users prequalified to be selectable identified by user to be allowed to get access to selected encrypted files on the cloud services. When a user needs to share one or more files the user will use the user's client function for selecting a further user of the prequalified selectable further users to select further user 9.1 to share with. The server then provides 10.1 the further user's public profile which is sent to the user's client. The user's browser client creates a copy 9.2 of the file key associated with the selected file, and then the user's browser client encrypts the file key 9.3 with the further user's public key comprised in the further user's public profile. The encrypted further user file key is added to the encrypted data file, the encrypted information file and the encrypted user file key 9.4. The client then stores the files or folder to the cloud services 12.2.

In this embodiment nothing happens with the share request until the further user logs in to the invention application at the server, optionally following the logic explained in FIG. 4 and FIG. 5. Upon successful login the further user's client sends a request for files from the cloud service 11.1. When the cloud service receives the request for files 12.2 from the further user's browser client, the cloud service responds with sending the files or folder.

When file is received by the further user the component running on the further user's client may decrypt the file key with the further user's private key 11.2 then decrypt the information file 11.3 contained in the encrypted file using the decrypted file key, and decrypt the data file with the decrypted file key 11.4. The further user's client now displays the data file that is shared by the user.

Figure 9:
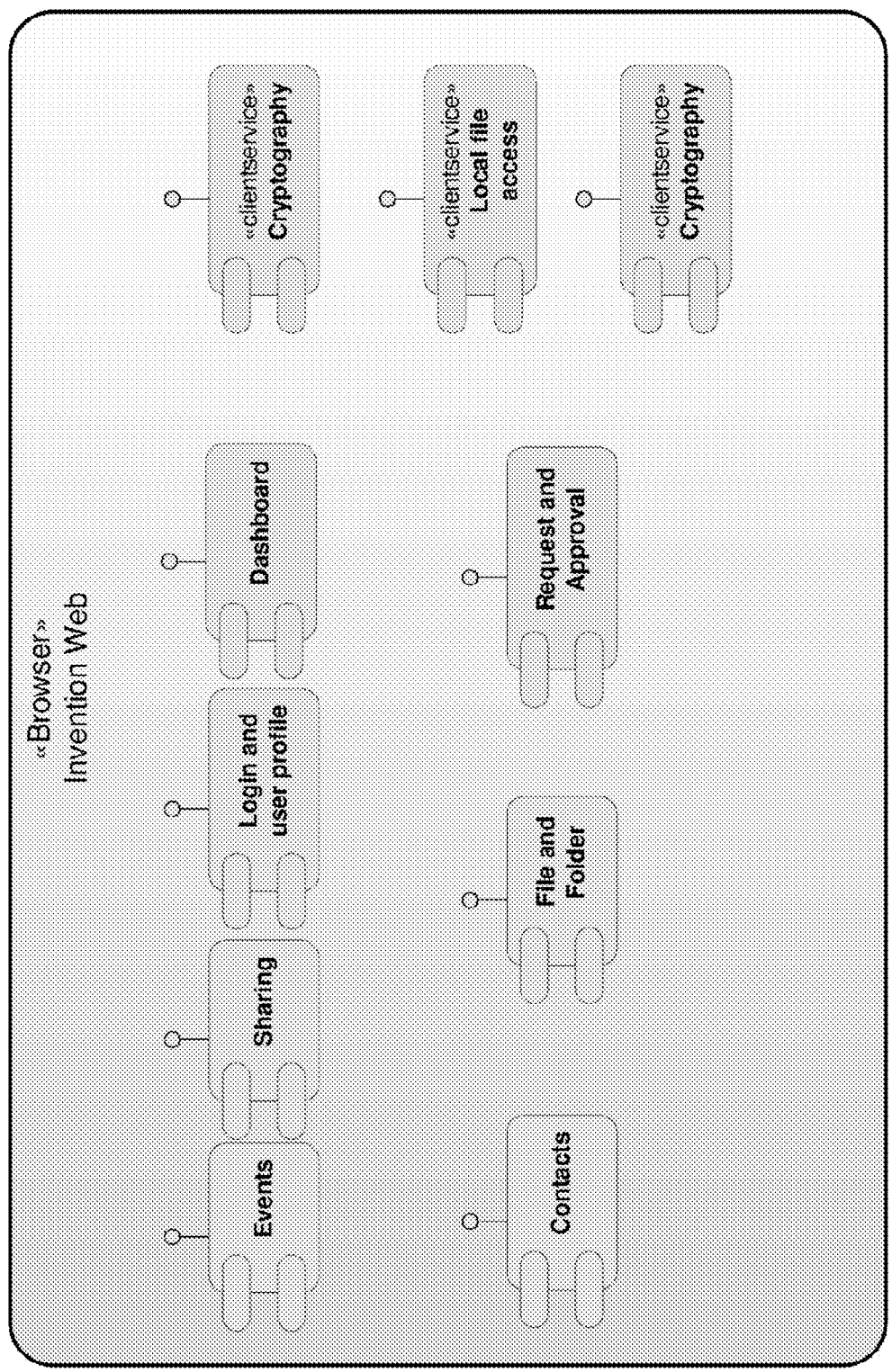
FIG. 9 is a principle outline of logical architecture.

The communication and exchange of information between user and server, and Further user and server in current invention are defined by several components. FIG. 9 shows some of these components that may be downloaded to client for execution on the client computer when associated information is to be provided by the client.

Figure 10:
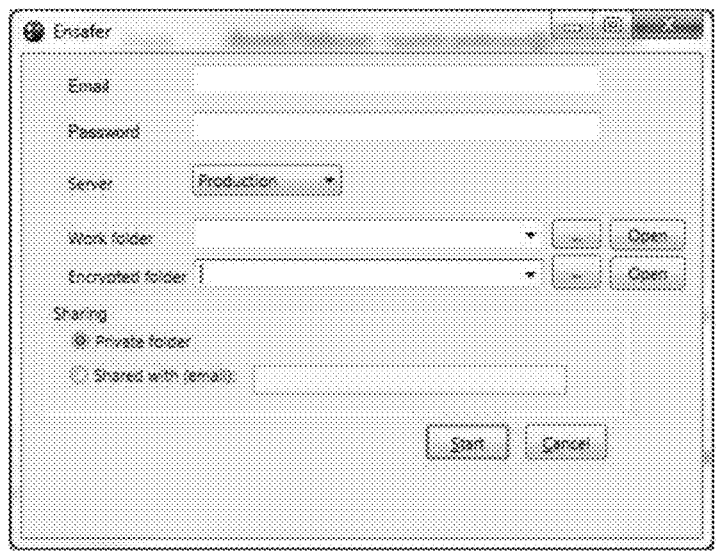
FIG. 10 is an example graphical user interface of a user selecting files or folders to share.

In FIG. 10 it is shown a graphical user interface where the application running in the user's computer, either as a web browser application or a preinstalled executable, communicates with both the server, the file manager of the user's computer device and the cloud services.

In the example the user fills in the fields for Email and Password, which is used to access the server for fetching the user's keys, public key and encrypted private key. This action requires that the user is already a registered user (not shown) of the server.

In this application the user s then prompted for two folders on the local disk, of which one is the work folder, and the second is the encrypted folder that synchronises to the cloud services (e.g. DropBox), the encrypted folder also being a subfolder on the users cloud services folder. It is further possible to display all the content of the folders by clicking the Open button in the dialog figure.

The user might want to define if the folder is to be shared with other users of the server application. This is defined by typing in the further users email address. For this to have full effect, the further user needs also to be a registered user of the same cloud services as defined by the user.

When all the values have been defined in the dialogue figure, the user clicks the Start button. This initiates the synchronisation process, and files not already being updated are encrypted and stored in the encrypted folder, and new files present in the encrypted folder is decrypted and stored in the work folder. The synchronisation process might be solved by OS services such as for example, but not restricted to, Microsoft Solution Framework. Each time a change is made to a file in the work folder, it will be encrypted using the file key, the file key encrypted by the user's public key, and stored in the encrypted folder, the file names shown in the folder also having an encrypted filename represented by a combination of the digits 0-9 and the letters a-f, followed by the file extension ".ensafer", although other file extension might be chosen. Each time a change is made to a file in the encrypted folder the opposite happens, the file is decrypted using the users private key to retrieve the file key, and the data file is decrypted using the decrypted file key.

The files that are new in the encrypted folder will be decrypted and placed in an unencrypted version in the work folder.

When the start button is activated it will change to a stop button, enabling the user to abort the operation.

Figure 11:
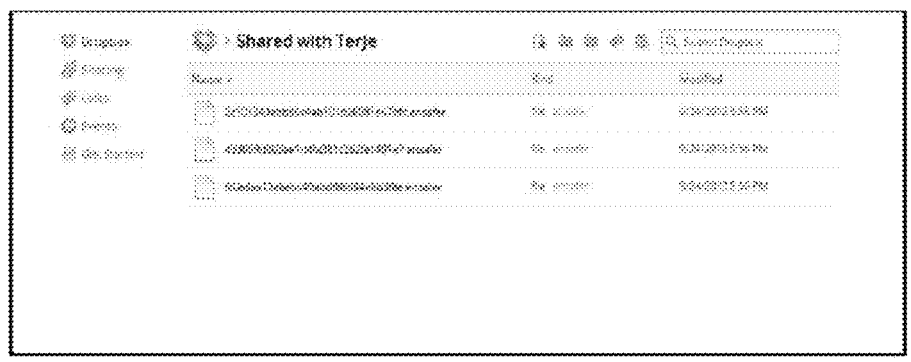
FIG. 11 is an example graphical user interface of a user displaying the encrypted files in a cloud services folder.

FIG. 11 is an example graphical user interface of a user displaying the encrypted files in a cloud services folder. Here the example makes use of the cloud services DropBox. The encrypted files are unreadable for anyone not able to first log in to the server application and fetch correct encryption keys, As defined earlier in the description it is possible to substitute some or all code downloaded by the user/further user browser clients with preinstalled code that can be executed whilst accessing the cloud services. It is also within the scope of the invention to comprise a solution where the server rely exclusively on the client and potential further user having preinstalled all components of code that is necessary to both generate encryption keys, passwords as well as hash functions and encryption executables, and then use the server as a key manager only, for secure storage of the keys. In such a latter environment it is assumed that the discussed embodiments do necessary minor changes to adapt for communication between the clients and the server.

It will be understood that the sequence or order of method steps described above has been presented for explanatory purposes, and that the same result, in certain cases, may be achieved with sequences that depart from what has been specifically described. For instance, any steps that are performed independent of each other may be performed in any order, or even simultaneously or concurrently.

Although the invention has been specified in the above as relating to a computer-implemented method, the skilled person will readily realize that the invention may also be embodied in the form of a computer program, which may be loaded into a memory in the server 1 or cloud services 5. Such a computer program includes processing instructions which enables the server 1 to perform the disclosed method when the instructions are executed by a processing device in the server 1 or cloud services 5. It will also be understood that the invention may be embodied as the server 1 or cloud services 5, when the server 1 or cloud services 5 is configured to (e.g. programmed to) perform the disclosed method.

It should be understood that the described method, server and computer program technically correspond to each other, and that any feature that has been described specifically for the method, should be considered as also being disclosed with its counterpart in the description of the server or computer program, and vice versa.

The invention claimed is:

1. A computer implemented method for secure storing of a data file via a computer communication network, comprising the steps of:
    providing a computer device of a user with code for;
        providing a unique user name for the user;
        asking the user for a password; generating an asymmetric key pair for the user having one public key and one private key;
        encrypting the private key of the user by means of a hash of the password, resulting in an encrypted private key;
        generating a file-specific symmetric key specific for the data file;
        encrypting the data file by means of the file-specific symmetric key, resulting in an encrypted data file;
        encrypting the file-specific symmetric key by means of the public key of the user, resulting in an encrypted file-specific symmetric key;
        where the code is executed by a web browser on the computer device; storing the encrypted file-specific symmetric key as a header part of the encrypted data file;
        interact with the file exchange interface of a cloud service;
        the cloud service receiving the encrypted data file and storing the encrypted data file and header part;
        storing the public key of the user and the encrypted private key of the user in a user management system,
    further providing the computer device of the user with code for:
        generating an information file with information about the data file;
        encrypting the information file by means of the file-specific symmetric key;
        where the code is executed by the web browser on the computer device;
        storing the encrypted information file as a header part of the encrypted data file and arrange it between the encrypted data file and the encrypted file specific symmetric key; and
        interact with the file exchange interface of a cloud service; the cloud service receiving the encrypted data file and storing the encrypted data file, the encrypted information file and header part.

2. The method according to claim 1, where the information about the data file comprises at least one of the following elements: a file creation date, a file name, a unique file identifier, created timestamp, modified timestamp, and a file size.

3. The method according to claim 1, where, upon receiving a login request comprising the unique user name from the computer device, the method comprises the following steps: identifying the user by means of the unique user name; generating a unique session-ID; encrypting the session-ID by means of the public key of the user; sending the encrypted private key of the user to the computer device; sending the encrypted session-ID to the computer device; providing the computer device of the user with code for: asking the user for the password; decrypting the encrypted private key by means of the hash of the password; decrypting the encrypted session-ID by means of the private key; where the code is executed by the web browser on the computer device; receiving the session-ID from the computer device; comparing the received session-ID with the generated session-ID; accepting the login request if the received session-ID is identical to the generated session-ID.

4. The method according to claim 2, where, upon receiving a login request comprising the unique user name from the computer device, the method comprises the following steps: identifying the user by means of the unique user name; generating a unique session-ID; encrypting the session-ID by means of the public key of the user; sending the encrypted private key of the user to the computer device; sending the encrypted session-ID to the computer device; providing the computer device of the user with code for: asking the user for the password; decrypting the encrypted private key by means of the hash of the password; decrypting the encrypted session-ID by means of the private key; where the code is executed by the web browser on the computer device; receiving the session-ID from the computer device; comparing the received session-ID with the generated session-ID; accepting the login request if the received session-ID is identical to the generated session-ID.

5. The method according to claim 4, where, upon successful login, the method comprises the following steps: launch a cloud services; and in the cloud services: select the required encrypted data file, receive the selected encrypted data file— providing the computer device with code for: decrypting the encrypted file-specific symmetric key by means of the private key; decrypting the encrypted data file by means of the decrypted file-specific symmetric key; where the code is executed by the web browser on the computer device.

6. The method according to claim 5, further comprising the steps of: providing the computer device with code for: decrypting the encrypted information file by means of the decrypted file-specific symmetric key; where the code is executed by the web browser on the computer device.

7. The method according to claim 4, further comprising: providing the computer device of the user with code for: providing an indication of which data file to share; providing an indication of a further user to share the data file with; where the code is executed by the web browser on the computer device; sending the public key of the further user to the computer device; providing the computer device of the user with code for: decrypting the encrypted file-specific symmetric key by means of the private key; encrypting the decrypted file-specific symmetric key as a further file-specific symmetric key by means of the public key of the further user; where the code is executed by the web browser on the computer device; launch a cloud services; and in the cloud services: storing the encrypted the specific symmetric key and the further encrypted further file-specific symmetric key as a header part of the encrypted data file.

8. The method according to claim 7, where, upon the cloud services receiving a data file request from the computer device of the further user; the method comprises the following steps: the cloud services sending the encrypted data file to the computer device of the further user; sending the encrypted further file-specific symmetric key to the computer device; providing the computer device of the further user with code for: decrypting the encrypted further file-specific symmetric key by means of the private key; decrypting the encrypted data file by means of the decrypted further file-specific symmetric key; where the code is executed by the web browser on the computer device.

9. The method according to claim 4, further comprising the step of: receiving a contact request from the computer device of the user for establishing contact between the user and a further user; sending a confirmation request to the further user; receiving an acceptance of the confirmation request from the further user; storing contact information about the contact between the user and the further user in the user management system.

10. The method according to claim 1, further comprising the steps of: providing the computer device with code for: decrypting the encrypted information file by means of the decrypted file-specific symmetric key; where the code is executed by the web browser on the computer device.

11. The method according to claim 1, further comprising the step of: receiving a contact request from the computer device of the user for establishing contact between the user and a further user; sending a confirmation request to the further user; receiving an acceptance of the confirmation request from the further user; storing contact information about the contact between the user and the further user in the user management system.

12. The method according to claim 1, further comprising: providing the computer device of the user with code for: providing an indication of which data file to share; asking the user for an e-mail address of a non-registered user to share the data file with; generating a password for the non-registered user; sending the password to the non-registered user; providing a hash of the password of the non-registered user by means of a hash function; generating a file specific symmetric key specific for the data file; encrypting the file-specific symmetric key by means of the password; where the code is executed by the web browser on the computer device; receiving the indication of which data file to share, the e-mail address, the hash of the password and the encrypted file-specific symmetric key; sending an e-mail to the e-mail address of the non-registered user containing a link to a page on the server; where, when the nonregistered user is opening the link, the server is providing the non-registered user with code for: asking the non-registered user for the e-mail address and the password; providing a hash of the password by means of the hash function; where the code is executed by the web browser on the computer device of the non-registered user; receiving the e-mail address and the hash of the password from the non-registered user; generating a unique session-ID; encrypting the session-ID by means of the hash of the password of the non-registered user; sending the encrypted session-ID to the computer device of the non-registered user; providing the non-registered user with code for: decrypting the encrypted session-ID by means of the hash of the password; where the code is executed by the web browser on the computer device; receiving the session-ID from the computer device of the non-registered user; comparing the received session-ID with the generated session-ID; when the non-registered user has accessed the cloud services and retrieved the encrypted file therefrom; providing the non-registered user with code for: decrypting the encrypted file-specific symmetric key by means of the password; decrypting the encrypted data file by means of the decrypted file-specific symmetric key; where the code is executed by the web browser on the computer device.

13. The method according to claim 12; where the password is sent to the non-registered user by means of an e-mail application installed on the computer device of the user.

14. The method according to claim 12, where the password is sent to the non-registered user by means of a SMS, MMS or similar service.

15. The method according to claim 1, where the code is preinstalled on the computer device prior to the information exchange with the server and the cloud services.

16. The method according to claim 15, where the operating system the code being preinstalled on the computer device is for running under is one of: Windows®, Linux®, Apple OS X®, iOS®, Android®, Windows for Mobile®.

17. A server computer, configured to perform a method as set forth in claim 1.

18. A computer program, comprising processing instructions which enables a server computer to perform a method as set forth in claim 1.

19. The method according to claim 1, where, upon receiving a login request comprising the unique user name from the computer device, the method comprises the following steps: identifying the user by means of the unique user name; generating a unique session-ID; encrypting the session-ID by means of the public key of the user; sending the encrypted private key of the user to the computer device; sending the encrypted session-ID to the computer device; providing the computer device of the user with code for: asking the user for the password; decrypting the encrypted private key by means of the hash of the password; decrypting the encrypted session-ID by means of the private key; where the code is executed by the web browser on the computer device; receiving the session-ID from the computer device; comparing the received session-ID with the generated session-ID; accepting the login request if the received session-ID is identical to the generated session-ID.

* * * * *